United States Patent
Maximo (10) Patent No.: US 10,810,508 B1
(45) Date of Patent: Oct. 20, 2020

(54) METHODS AND APPARATUS FOR CLASSIFYING AND DISCOVERING HISTORICAL AND FUTURE OPERATIONAL STATES BASED ON BOOLEAN AND NUMERICAL SENSOR DATA

(71) Applicant: EMC IP Holding Company LLC, Hopkinton, MA (US)

(72) Inventor: André de Almeida Maximo, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 932 days.

(21) Appl. No.: 15/076,774

(22) Filed: Mar. 22, 2016

(51) Int. Cl.
*G06N 20/00* (2019.01)
*G06K 9/62* (2006.01)
*G06F 16/35* (2019.01)
*G06N 20/10* (2019.01)
*G06N 20/20* (2019.01)
*G06K 9/00* (2006.01)

(52) U.S. Cl.
CPC ............. *G06N 20/00* (2019.01); *G06F 16/35* (2019.01); *G06K 9/6269* (2013.01); *G06K 2009/00738* (2013.01); *G06N 20/10* (2019.01); *G06N 20/20* (2019.01); *Y02P 80/15* (2015.11)

(58) Field of Classification Search
CPC ........ G06N 20/00; G06N 20/10; G06N 20/20; G06N 7/005; G05B 23/0227; G06K 9/6269; G06K 2009/00738; Y02P 80/15; G06F 16/35
USPC ..................................................... 706/12, 15
See application file for complete search history.

(56) References Cited

U.S. PATENT DOCUMENTS

2006/0247547 A1\* 11/2006 Sarkar .................. A61B 5/0464
  600/515
2007/0080816 A1\* 4/2007 Haque .................. B60K 28/066
  340/576

(Continued)

OTHER PUBLICATIONS

Elliot, Mark; Fairweather, Ian; Olsen, Wendy; Pampaka, Maria. "A Dictionary of Social Research Methods", 2016, Oxford University Press, 1st ed. (Year: 2016).\*

*Primary Examiner* — Shane D Woolwine
(74) *Attorney, Agent, or Firm* — Ryan, Mason & Lewis, LLP (57) ABSTRACT

Methods and apparatus are provided for classifying and discovering historical and future operational states. An exemplary method comprises obtaining historical Boolean sensor data from sensors for a given time; generating a plurality of signatures over time comprised of the historical Boolean sensor data from the sensors for a corresponding given time; determining a plurality of time intervals having a corresponding interval signature, wherein each time interval is comprised of consecutive time units having a substantially same signature; assigning a predefined state to each time interval based on the interval signatures using a clustering method; obtaining, for each time interval, historical numerical sensor data from the sensors corresponding to measurements of the sensors during the associated time interval; and training a model using the historical numerical sensor data as an input, and the predefined state assigned to each time interval as a target output, to obtain coefficients of the machine learning model.

20 Claims, 3 Drawing Sheets

(56) References Cited

U.S. PATENT DOCUMENTS

| | | | |
|---|---|---|---|
| 2007/0271205 A1* | 11/2007 | Aravamudan | G06F 16/335 |
| | | | 706/12 |
| 2007/0282766 A1* | 12/2007 | Hartman | G05B 13/048 |
| | | | 706/15 |
| 2012/0041920 A1* | 2/2012 | Kim | G06N 7/005 |
| | | | 706/52 |
| 2014/0210625 A1* | 7/2014 | Nemat-Nasser | G08B 21/06 |
| | | | 340/575 |
| 2015/0364198 A1* | 12/2015 | D'Abreu | G11C 16/16 |
| | | | 365/185.11 |
| 2016/0033962 A1* | 2/2016 | Cote | G05B 19/41885 |
| | | | 700/29 |
| 2016/0216706 A1* | 7/2016 | Christensen | G05B 19/41865 |
| 2016/0335435 A1* | 11/2016 | Schmidtler | G06F 21/562 |
| 2017/0018923 A1* | 1/2017 | Rombouts | G06Q 50/06 |
| 2018/0134118 A1* | 5/2018 | Hintea | B60H 1/00742 |

\* cited by examiner

SIGNATURES TABLE – 300

| ts | sig |
|---|---|
| 1367409600 | 1010110010110110 ... 1011010110000000 |
| 1367409660 | 1000010110000011 ... 0001000010000000 |
| ⋮ | ⋮ |

FIG. 4

INTERVALS TABLE – 400                    410

| int | sig | STATE |
|---|---|---|
| 1366027200 \| 1367186400 | 10101100111 ... 11011111100 | 5 |
| 1367373600 \| 1367442000 | 10101100111 ... 11011111100 | 2 |
| ⋮ | ⋮ | ⋮ |

FIG. 5

CLASSIFICATION MATRIX – 500

510

| classm | classv |
|---|---|
| 2.37  4.1  8.06 ... 7.2  126.35 | 5 |
| 50.1  23.0  1.5 ... 5.1  86.436 | 2 |
| ⋮ | ⋮ |

FIG. 6

MACHINE LEARNING MODEL
TRAINING PROCESS
600

METHODS AND APPARATUS FOR CLASSIFYING AND DISCOVERING HISTORICAL AND FUTURE OPERATIONAL STATES BASED ON BOOLEAN AND NUMERICAL SENSOR DATA

FIELD

The field relates generally to techniques for processing Boolean and numerical data flows generated by industrial sensors streams in an industrial plant, and, more particularly, to the classification and discovery of current and future operational states in the industrial plant based on the Boolean and numerical data flows.

BACKGROUND

Industrial plants often use a combination of programmable logic controller (PLC) hardware and supervisory control and data acquisition (SCADA) systems to remotely monitor and control the every day activities of processes in the plant. As the level of automation and control increases, the industrial plant becomes a highly monitored area with data flowing in streams from digital sensors attached to equipment in the plant to the control room, where actions may be taken depending on the data. The sensor streams typically communicate Boolean or numerical values through various media in the industrial area. Boolean values generally indicate, for example, whether or not a piece of equipment is in a particular predefined state (such as turned on or off, or in a manual or automatic control mode). Numerical values are typically represented by integer or floating-point data and carry information about the industrial process, such as pressure, volume and/or temperature measurements related to the equipment.

Machine learning techniques focus on the construction of models that can infer or learn patterns appearing in input data, such as the data from industrial sensor streams. These patterns may be used to predict, for instance with a linear model, the next value that will appear in a given sensor stream, allowing potential problems to be anticipated. Additionally, patterns in the sequence of bits may be used to categorize an operational state via a clustering method, such as an unsupervised machine learning technique.

When machine learning techniques are applied to prohibitively large data (e.g., data that does not fit in one computer system memory), the input data is often subdivided and processed by a number of interconnected computers, commonly referred as clusters. While the sequence of bits related to Boolean condition states of the entire plant may describe the overall status of its various equipment, and the sequence of bits related to integer or floating-point numbers may describe the present quantifiable industrial process information, the ability to process both types of sequences of data to classify and identify the current operational state has not been addressed.

A need therefore exists for methods and apparatus for classifying and discovering historical and future operational states of an industrial plant, that uses sequences of bits containing both Boolean data and numerical data generated from a number of available digital sensors.

SUMMARY

Illustrative embodiments of the present invention provide methods and apparatus for classifying and discovering historical and future operational states. In one exemplary embodiment, a method comprises obtaining historical Boolean sensor data from a plurality of sensors for a given time, wherein each bit in the historical Boolean sensor data corresponds to a state of a given one of the plurality of sensors for the given time; generating a plurality of signatures over time, wherein each of the plurality of signatures is comprised of the historical Boolean sensor data from the plurality of sensors for a corresponding given time; determining a plurality of time intervals, each having a corresponding interval signature, wherein each of the time intervals is comprised of a plurality of consecutive time units having a substantially same signature; assigning a predefined operational state to each of the plurality of time intervals based on the interval signatures of the plurality of time intervals using a clustering method; obtaining, for each of the plurality of time intervals, historical numerical sensor data from the plurality of sensors, wherein the historical numerical sensor data corresponds to measurements of the plurality of sensors during the associated time interval; and training a machine learning model using the historical numerical sensor data for each of the plurality of time intervals as an input, and the predefined operational state assigned to each of the plurality of time intervals as a target output, to obtain a plurality of coefficients of the machine learning model.

In one or more embodiments, the plurality of signatures over time are stored in one or more signature tables and the plurality of time intervals and corresponding interval signatures in one or more interval tables. The predefined operational state assigned to each of the plurality of time intervals can also be stored in the one or more interval tables.

In at least one embodiment, the plurality of coefficients can be applied to a classifier to classify current numerical sensor data or to determine an operational state of an industrial plant. A second machine learning model is optionally trained using historical numerical sensor data for each of the plurality of time intervals as an input, and the next predefined operational state assigned to each of the plurality of time intervals as a target output. In this manner, the second machine learning model can be employed to discover one or more future operational states.

Advantageously, illustrative embodiments of the invention provide improved techniques for classifying and discovering historical and future operational states in an industrial plant based on both Boolean and numerical data flows. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for classifying and discovering historical and future operational states. While aspects of the present invention are illustrated in the context of the oil-and-gas industry, the present invention applies in any environment where Boolean and numerical data are processed to classify and/or discover operational states in an industrial plant.

One or more embodiments of the invention provide an algorithm to classify and discover the current and next operational states of an industrial plant based on Boolean and numerical sensor data, in order to understand the various operational states that an industrial plant undergoes and to act with appropriate measures (for example, avoiding a risk of entering an even worse state). One or more models are generated that can be used for diagnosis and prognosis of the operational state of an industrial plant given the measurements of its sensors data.

Boolean and Numerical Data Representations

Boolean values from a given sensor are usually represented by one bit per instrument or equipment that the sensor is associated with, where the one bit indicates, for example, that an instrument is on (e.g., a binary value of 1) or off (e.g., a binary value of 0). Many Boolean sensors may be associated with a single piece of equipment and may form a sequence of bits, indicating, for example, different alarm ranges, such as one bit to indicate if the high alarm is on and another bit to indicate if the low alarm is on.

Numerical data, as used herein, comprises integer and floating-point numbers on a digital sensor or system, or a plurality of digital sensors and systems. Integers are usually represented by a sequence of 32 bits, where the first bit is the sign bit, in the case of signed integers, indicating if it is a positive or negative integer number, and the remaining bits are the integer number itself in base-2. Unsigned integers do not have the sign bit, using the first bit as one more bits for the number itself. The floating-point type allows expressing the fractional part of a number by inserting into the sequence, with usually the same 32 bits length, the exponent. The second bit to the ninth bit usually represents this exponent as an integer between a minimum and a maximum exponent in base-2. The exponent may be biased in the sense that it is subtracted by a fixed number to represent negative and positive exponents. A bias of 127 means the exponent varies from −127 to 128. The tenth bit to the final bit of the sequence usually represents the fraction part of the floating-point number. The fraction may be in normalized form, in which case the most significant bit is hidden in the sequence since it is always 1 in binary.

One or more rules may be applied to the numerical sensor data to obtain Boolean sensor values indicating whether the sensor data suggests a particular state of the related equipment.

Integer and floating-point numbers may be represented by a different specification and may have a different length of bits. There are several international standards that guide the definition of numbers on digital sensors and systems, and the digital sensor or system may even use a different base than binary (base-2). The exemplary explanation given for integer and floating-point numbers serves as a baseline for the concepts used by the invention, and shall not be interpreted in a limiting sense, as would be apparent to a person of ordinary skill in the art. The methods and apparatus described herein is designed to work independently from the specification, length and base of the number.

For a more detailed discussion of suitable data structures and algorithms used to construct the operational states in accordance with one or more embodiments of the invention, such as k-means clustering methods, logistic regression models, multilayer perceptrons, restricted Boltzmann machines and neural network algorithms, see, for example, C. Bishop, "Pattern Recognition and Machine Learning," (Springer, 2006).

Classifying and Discovering Historical and Future Operational States

As noted above, one or more embodiments of the invention classify and discover the current and next operational states of an industrial plant based on Boolean and numerical sensor data.

Figure 1:
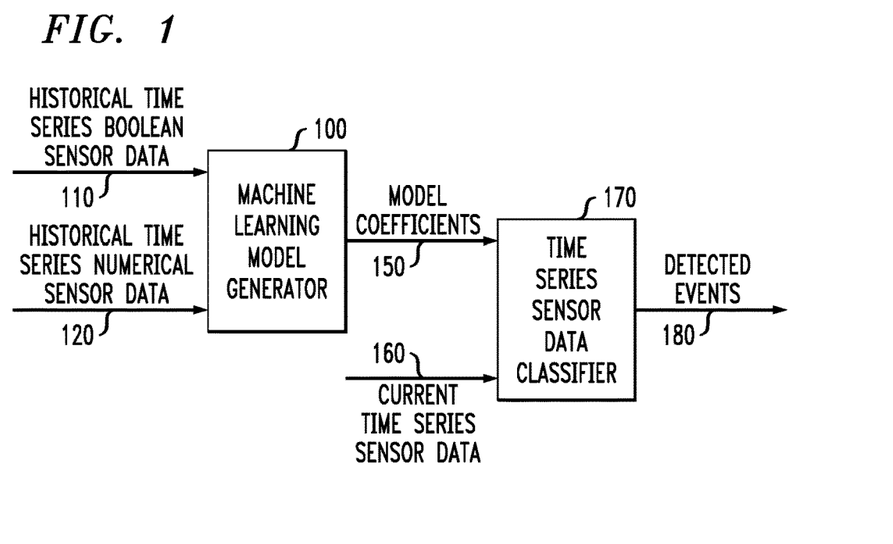
FIG. 1 is a block diagram of a machine learning model generator that processes historical Boolean and numerical sensor data, in accordance with an embodiment of the invention, to generate a model that may be used to classify current time series sensor data.

FIG. 1 is a block diagram of a machine learning model generator 100 that processes historical time series Boolean sensor data 110 and historical time series numerical sensor data 120, in accordance with an embodiment of the invention, to generate coefficients 150 of a model (discussed further below in conjunction with FIG. 6). The coefficients 150 of the model (discussed further below in conjunction with FIG. 6) may be used to classify current time series sensor data 160, in order to detect one or more predefined events 180 (or characterize the overall state of an industrial plant).

Figure 2:
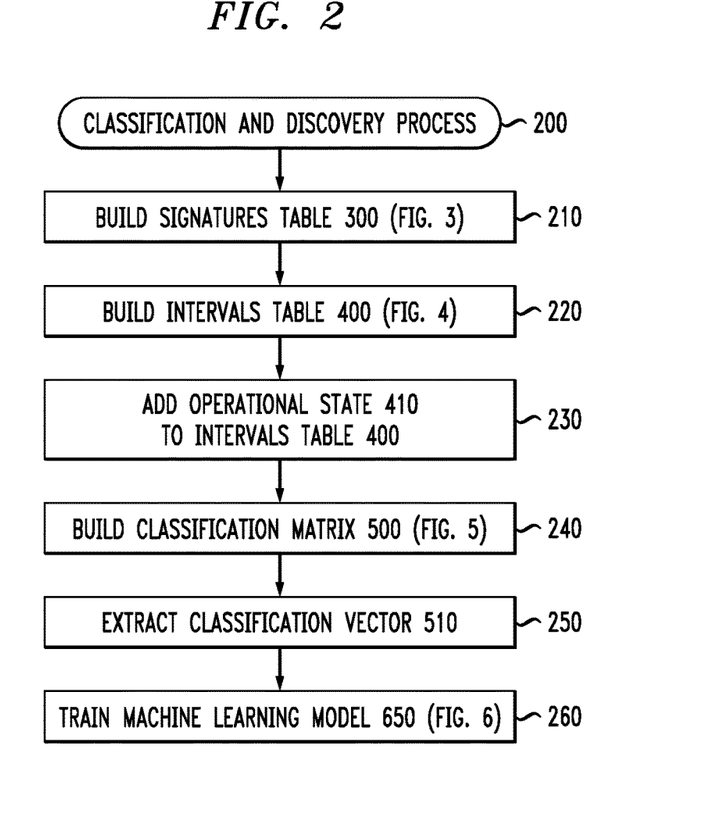
FIG. 2 is a flow chart illustrating an exemplary implementation of an exemplary classification and discovery process according to one embodiment of the invention.

FIG. 2 is a flow chart illustrating an exemplary implementation of an exemplary classification and discovery process 200 according to one embodiment of the invention. Generally, the exemplary classification and discovery process 200 classifies and discovers historical and future operational states in one or more industrial plants. As shown in FIG. 2, the exemplary classification and discovery process 200 initially builds a signatures table 300, as discussed further below in conjunction with FIG. 3, by first constructing a signature from Boolean sensor data for each time stamp, and then forming a table with the timestamp and the corresponding signature for each row.

Each signature is an array of bits with each bit comprising a single Boolean sensor datum. More specifically, each signature comprises all Boolean sensor data of the industrial plant, ordered in a consistent way across all signatures but in no particular order, and the signature is associated with a time stamp in which the signature was observed. The final exemplary signatures table 300 (discussed further below in conjunction with FIG. 3) contains two columns: time stamp and signature; with one signature observation per row.

Figure 3:
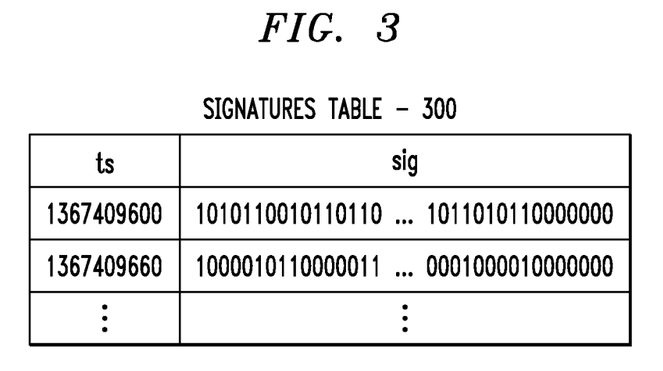
FIG. 3 illustrates an exemplary signatures table according to one embodiment of the invention.

During step 220, the exemplary classification and discovery process 200 builds an intervals table 400, as discussed further below in conjunction with FIG. 4, with an interval, as a pair of first and last time stamps in the interval, and a signature per row, where the same signature is observed for all time stamps within the interval. Thus, step 220 builds the intervals table 400, where the interval is a pair of time stamps and the intervals of interest occur when the same signature is observed during the entire interval. One row of the intervals table 400 contains the interval int and the signature observed in this interval. The intervals table 400 is built by scrolling the signatures table 300 in search for sequences of the same signature occurring in different but sequential time stamps. The sequence of time stamps is discarded and only the first and last time stamps are stored in the interval int. The size of these sequences, that is the intervals, is arbitrary, and can be different from one row of the intervals table 400 to the other. It is generally the case, for a given industrial plant, to have a fixed period of time to consider as a steady condition, and to use this period as a restriction to the size of the interval. This restriction may be imposed on both the minimum and maximum size for an interval to be considered valid to enter in the intervals table intt. The result is that not all signatures from the signatures table 300 will appear in the intervals table 400, with the final intervals table 400 containing two columns: interval int and signature sig; where each row of this table is one repeated signature observation during a period of time. An operational state is an artificial label of the overall condition of the industrial plant's operation and it is normally represented as an integer, that is an index to a description of each particular state.

During step 230, the exemplary classification and discovery process 200 adds an operational state 410 to the intervals table 400 (FIG. 4), for each row of the intervals table, by clustering the nearest signatures together in the same operational state. Step 230 thus adds a state column 410 to the intervals table 400, with the operational state in which the plant is operating, on each row of the intervals table 400, or each particular interval. In one or more embodiments, the state column 410 of the intervals table 400 is filled automatically by a clustering method, such as an unsupervised machine learning technique. The signatures of each interval in the intervals table 400 can be regarded as a matrix, where each row is one observation (in a given interval) and each column is one bit of a Boolean sensor. This matrix is then the input to the clustering method, and the output is one cluster label for each row of the matrix. Rows with similar signatures are clustered to the same cluster, and will be assigned to the same label. The choice of the best clustering method to use depends mainly on the Boolean sensors data, which in turn depends on the target industrial plant where the operational state is the object of analysis. The result is that all signatures from the intervals table 400 are reduced to a fixed number of clusters, appearing in the state column 410 added to the intervals table 400.

The state is a collection of similar signatures and it works as a label describing a high-level operational condition, such as normal (for instance state 1) or abnormal (for instance state 2) operational states. The semantics of each state is normally assigned manually by a person with domain knowledge, for instance, by a worker of the industrial plant, and outside the scope of the present invention. The assignment of a state to each collection of similar signatures, on the other hand, is normally done automatically and within the scope of step 230. Nevertheless, in cases when this assignment is done manually, for instance, the state column 410 of the intervals table 400 is filled by a worker of the industrial plant, step 230 is skipped and the algorithm continues normally to the step 240.

During step 240, the exemplary classification and discovery process 200 builds a classification matrix (classm) 500, as discussed further below in conjunction with FIG. 5, by constructing a class from numerical sensors data observed in a given interval int from the intervals table 400. Step 240 thus builds the classification matrix 500, similar to the signatures matrix used for the clustering method in step 230. Inside each interval int, there is a sequence of time stamps ts, where each time stamp marks the instant of time where the sensors in an industrial plant made an observation, or measurement, of either a Boolean sensor or a numerical sensor. It is noted that steps 210, 220 and 230 of the classification and discovery process 200 deal with Boolean sensors data, ignoring the data coming from the numerical sensors streams. Step 240 complements steps 210, 220 and 230 by aggregating all numerical sensors data in one class, and all classes from all intervals of interest in the classification matrix 500. Each row of the classification matrix 500 stores one class, that is the numerical data measured by all numerical sensors during the exact same interval of time int appearing on each row of the intervals table 400. Each column of the classification matrix 500 stores one number, normally represented as a floating-point number, for each time stamp inside the interval int and for each numerical sensor of the industrial plant. This nested structure, of time stamps inside sensors, may be represented as one extra dimension in the classification matrix 500, without loss of generality to step 240. The result is that the classification matrix 500 stores all numerical data measured in all intervals of interest, whereas the signatures matrix from step 230 stores all Boolean data observed in the same intervals of interest.

During step 250, the exemplary classification and discovery process 200 extracts a classification vector (classy) 510 (FIG. 5), as the state column 410 from the intervals table 400. Step 250 thus extracts the classification vector 510 from the intervals table 400. The classification vector 510 is the state column 410 from the intervals table 400 and thus it is represented as an array of integers, where each integer is the operational state in which the industrial plant is on each interval. The order of this array respects the order of the intervals appearing in the intervals table 400, that is the same order of rows from the classification matrix 500.

During step 260, the exemplary classification and discovery process 200 trains a machine learning model 650, as discussed further below in conjunction with FIG. 6, from the classification matrix 500 and the classification vector 510. Step 260 thus trains a classification model 650 that is capable of inferring operational states, using a supervised machine learning technique for classification, and having the classification matrix 500 as input variables and the classification vector 510 as target output variables.

As noted above, the classification matrix 500 is constructed from all numerical sensors data and the classification vector 510 is derived from all Boolean sensors data. The classification model 650 may be trained using any machine learning technique, the choice of one over the other generally depends on both numerical and Boolean sensors data, which in turn depends on the target industrial plant where the operational state is the object of inference. The result is a classification model 650 that classifies an industrial plant, given all its numerical sensors data measured over a given period of time, in one operational state from all possible operational states that appear in the state column 410 of the intervals table 400.

As used herein, a model is a mathematical equation, or a plurality of equations, that relates one or more input variables to one or more output variables of a particular data set. It usually represents what can be learned from the observed data, in terms of how the data was generated. In the context of operational states of an industrial plant, the intended model relates all the sensors data as input variables to a corresponding operational state as an output variable.

The exemplary implementation of the classification and discovery process 200 can be instantiated, for example, to address the specific problem of classifying and discovering operational states of an offshore oil-and-gas platform. In at least one implementation, the frequency of the time stamp recorded is one per minute, the interval int chosen for the same signature to be observed is twenty minutes. There are ten states in which all signatures per interval are clustered, and the method used to cluster all signatures is a k-means clustering technique.

In one or more embodiments, the classification matrix 500 is built with a nested block structure and can be regarded as a tensor. The final trained model 650 uses multiple layers to be constructed, as a multilayer perceptron, using two stacked restricted Boltzmann machines and one logistic regression layer on top.

The resultant model 650 can be used to discover the operational state of an industrial plant. For example, after executing the exemplary classification and discovery process 200 using historical data, the trained model 650 may be used to discover the current operational state given recent sensor data captured over a period of time. Additionally, the trained model 650 may be used to classify a past operational state given the historical data not used in the training of the model 650.

In one variation, a different model can be trained in step 260 of the classification and discovery process 200 to discover future operational states. The approach is largely the same as previously described in conjunction with FIG. 2; the classification vector 510 extracted in step 250, however, that contains the operational state of the industrial plant for each interval int of the intervals table 400, is replaced by another classification vector containing the next operational state in which the industrial plant is known to go to. The next operational states also appear in the state column 410 of the interval table 400, as it contains all intervals of interest derived from the signatures table 300, and can be extracted from the same column of the same table, however using rows of future intervals instead of rows of current intervals. In other words, instead of using the state of the same (current) interval in the classification vector, it is replaced by the future (next) interval state. So here, the training is still happening in historical data (no online data), and for each interval, an operation state that the industrial plant is known to be in is processed. Step 250 of the classification and discovery process uses, for each row of the classification vector 510, the same intervals on the rows of the classification matrix 500. In this variation, the classification vector 510 is "shifted" to, instead of using the same interval, using the next operational state. In this way, the trained model 650 will be able to predict the next operational state instead of classifying the current operational state of the industrial plant.

When the rows of the interval table 400 are ordered by the intervals of time, the next classification vector is a shift of the classification vector 510. Step 260 remains the same and produces a different classification model, that is capable of classifying future instead of present operational states of an industrial plant, given all numerical sensors data measured over a given period of time.

There are several additional variations of the classification and discovery process 200. One is to specialize the algorithm for a selection of, either numerical or Boolean sensors, given a special interest in a subset of sensors, despite using all available sensors. Steps 210 and 240 change to consider only a selection of Boolean sensors to construct each signature sig, and only a selection of numerical sensors to construct each class. Another variation of the classification and discovery process 200 is to reuse the sensors data from one industrial plant to another similar industrial plant, for instance, a newly started copy of a previous functional plant.

Yet another variation of the classification and discovery process 200 is to adapt the clustering of signatures into operational states, done in step 230, to comprehend all possible signatures of the signatures table 300, instead of only the signatures appearing in the intervals table 400. This variation changes the classification vector 510, making the model 650 trained in step 260 more comprehensive, for both present and future operational states. On the other hand, the model 650 may be more error prone, since it is more susceptible to operational states that may be considered irrelevant.

An additional variation of the classification and discovery process 200 is to adapt the process for a multi-core computer or a multi-node server. A multi-core computer system is composed of a number of processing units capable of carrying out the computation in parallel, as if each one is a separable computer system. A multi-node server is a distributed environment with a number of interconnected computer systems. One strategy to parallelize the classification and discovery process 200 is to divide, for each step, the input data into separate smaller data sets with similar sizes, one for each computer system, and execute several instances of the algorithm. There are a number of clustering methods and classification techniques that enable the parallelization of the third and sixth steps of the algorithm.

FIG. 3 illustrates an exemplary signatures table 300 according to one embodiment of the invention. As discussed above in conjunction with FIG. 2, each signature sig in the second column of the exemplary signatures table 300 is an array of bits with each bit comprising a single Boolean sensor datum. In other words, each signature sig comprises Boolean sensor data of the industrial plant, ordered in a consistent way across all signatures but in no particular order, and the signature sig is associated with a time stamp ts (shown in the first column of the exemplary signatures table 300) in which the signature was observed. Thus, the exemplary signatures table 300 contains two columns: time stamp ts and signature sig; with one signature observation per row.

Figure 4:
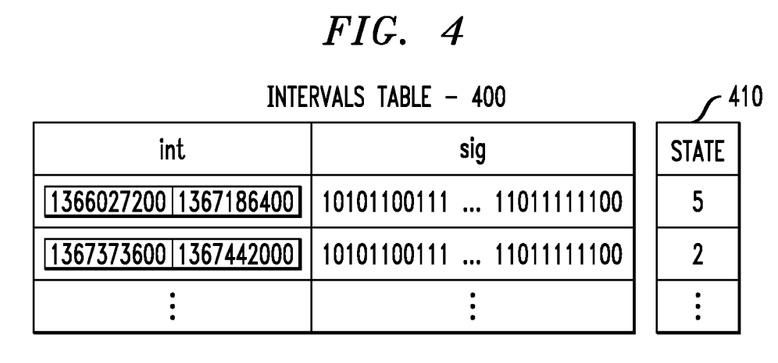
FIG. 4 illustrates an exemplary intervals table according to one embodiment of the invention.

FIG. 4 illustrates an exemplary intervals table 400 according to one embodiment of the invention. As discussed above in conjunction with FIG. 2, each row of the intervals table 400 comprises an interval int and the signature sig observed in this interval. The interval is a pair of time stamps and the intervals of interest occur when the same signature is observed during the entire interval. The intervals table 400 is built by scrolling the signatures table 300 in search for sequences of the same signature occurring in different but sequential time stamps. The sequence of time stamps is discarded and only the first and last time stamps are stored in the interval (int) column of the table 400. It is noted that not all signatures from the signatures table 300 will appear in the intervals table 400. The intervals table 400 initially comprises two columns: interval int and signature sig; where each row of this table is one repeated signature observation during a period of time.

As noted above, during step 230 an operational state 410 is added to each row of the intervals table 400, by clustering the nearest signatures together in the same operational state. Step 230 thus adds the state column 410 to the intervals table 400, with the operational state in which the plant is operating, on each row of the intervals table 400, or each particular interval. Rows with similar signatures are clustered to the same cluster, and will be assigned to the same state label. Signatures from the intervals table 400 are reduced to a fixed number of clusters, appearing in the state column 410 of the intervals table 400. An operational state is a label of the overall condition of the industrial plant's operation and it is normally represented as an integer, that is an index to a description of each particular state.

Figure 5:
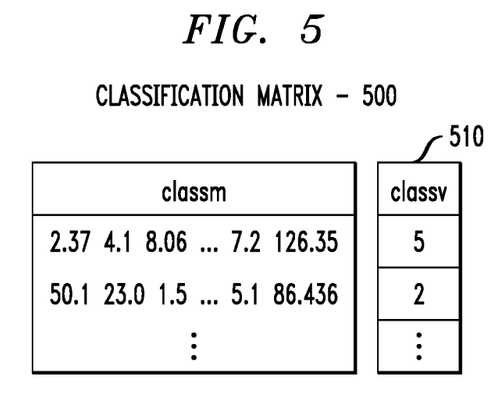
FIG. 5 illustrates an exemplary classification matrix according to one embodiment of the invention.

FIG. 5 illustrates an exemplary classification matrix 500 according to one embodiment of the invention. As discussed above in conjunction with FIG. 2, the exemplary classification matrix 500 is generated by constructing a class from numerical sensor data observed in a given interval int from the intervals table 400. Each row of the classification matrix 500 stores one class, that is the numerical data measured by all numerical sensors during the same interval of time int appearing on each row of the intervals table 400. All of the time stamps inside a given interval from all numerical sensors compose the numerical values in the row of the exemplary classification matrix 500. The values appear next to each other for each time stamp of the interval, and next to each other for each numerical sensor of the industrial plant.

Each column of the classification matrix 500 within a given interval stores one number, normally represented as a floating-point number, for each time stamp is inside the interval int and for each numerical sensor of the industrial plant. This nested structure, of time stamps inside sensors, may be represented as one extra dimension in the classification matrix 500. The result is that the classification matrix 500 stores all numerical data measured in all intervals of interest.

In addition, classification vector (classy) 510 of FIG. 5 is extracted as a duplicate of the state column 410 from the intervals table 400. The classification vector 510 is thus the state column 410 from the intervals table 400 and is represented as an array of integers, where each integer is the operational state in which the industrial plant is on each interval. The order of this array respects the order of the intervals appearing in the intervals table 400, that is the same order of rows from the classification matrix 500.

Figure 6:
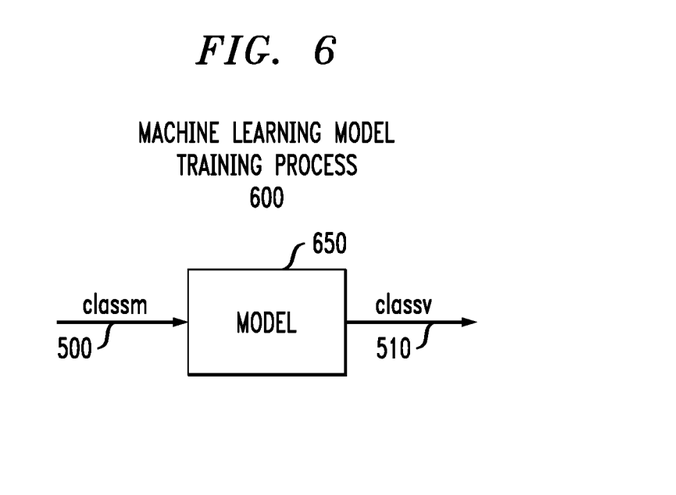
FIG. 6 illustrates an exemplary implementation of a machine learning model training process according to one embodiment of the invention.

FIG. 6 illustrates an exemplary implementation of a machine learning model training process 600 according to one embodiment of the invention. As discussed above in conjunction with FIG. 2, step 260 of the exemplary classification and discovery process 200 trains the machine learning model 650 using the classification matrix 500 as input and the classification vector 510 as the target output. The trained classification model 650 can infer operational states, using a supervised machine learning technique for classification.

In one or more embodiments, the disclosed classification and discovery process 200 is an algorithm for the digital organization and identification of operational states in an industrial plant. More specifically, the exemplary classification and discovery process 200 creates a digital signature from a set of sensors streams to discover close operational conditions and relate them to periods in time. The classes unveil operational states allowing the classification and discovery process 200 to instantiate sensors snapshots of the entire industrial plant, potentially using all its sensors streams, and to leverage these snapshots to infer present and future operational states. In particular, the classification and discovery process 200 has different variants corresponding to different ways of organizing and identifying sensors streams exposed by the digital signatures and classes.

CONCLUSION

Among other benefits, aspects of the present invention classify and discover historical and future operational states in an industrial plant based on both Boolean and numerical data flows. In addition, one or more embodiments of the invention define an algorithm to classify and discover historical and future operational states that is based on available sensors data and available instants of measurements of a given industrial plant. More specifically, the exemplary classification and discovery process 200 provides an organization structure for both Boolean and numerical data generated by the digital sensors, considering when the measurement data was generated and combining them in a classification followed by discovery methods. In one or more embodiments, the exemplary classification and discovery process 200 is well suited for data originated from a large number of digital sensors, where a high-level operational state of the entire industrial plant is difficult to infer and predict from the sensor data.

One advantage of using the exemplary classification and discovery process 200 is in scenarios where the data generated from sensors in an industrial plant is not harnessed to infer or predict operational states of the plant. For example, in an offshore oil-and-gas platform, that is an industrial plant for the extraction and production of oil and gas, the sensor data are generally used for the daily activities and uploaded via satellites to onshore data centers for archiving purposes only. The present invention allows one computer system, or a plurality of computer systems, to analyze the sensor data, either locally or remotely, in order to classify, within a certain accuracy, in which operational state the plant was operating over time, and, additionally, to discover, within a certain probability, in which operational state the plant will operate in future time.

Another advantage of using the exemplary classification and discovery process 200 is in the context of multiple similar industrial plants. The exemplary classification and discovery process 200 acts on a collection of Boolean values and numerical values, generated from sensors installed on equipment of a given industrial plant, that are not necessarily restricted to work only in the industrial plant where the data was originated. A second industrial plant with similar equipment and sensors (for instance, a newly started copy of a previous functional plant) may benefit from the analysis already done in the sensors data of the first plant. The analysis may allow the categorization, within a certain accuracy, of the current operational state and the prediction, within a certain probability, of the next operational state for an industrial plant with unreliable, or even without, historical data. Additionally, this process may extend to any number of similar industrial plants.

Moreover, other forms and advantages of the invention will in part be obvious and will in part be apparent from the specification and drawings. It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary distributed computing environment 400. Such components can communicate with other elements of the exemplary metadata storage environment 100 over any type of network or other communication media.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
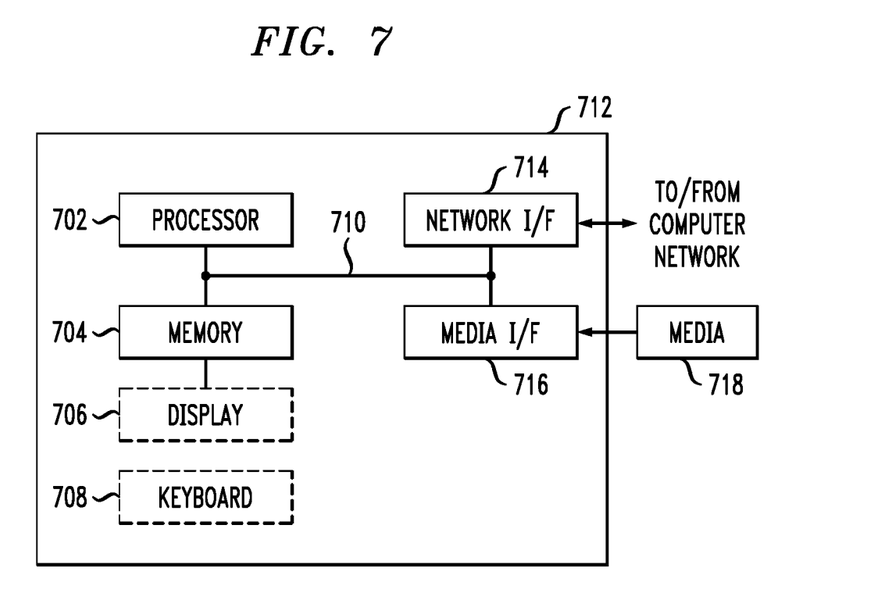
FIG. 7 is a system diagram of an exemplary computer system on which at least one embodiment of the invention can be implemented.

By way of example, an aspect of the present invention can make use of software running on a general purpose computer. FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
obtaining historical Boolean time series sensor data from a plurality of sensors, wherein said time series sensor data comprises a plurality of bits from each of said plurality of sensors, wherein each of the plurality of bits for a given one of said plurality of sensors corresponds to a state of a given one of said plurality of sensors for a given time;
generating a plurality of signatures indexed in time order based on respective timestamps associated with the plurality of signatures, wherein each of said plurality of signatures is comprised of a sequence of bits comprising one bit of said historical Boolean time series sensor data from each of said plurality of sensors for a corresponding given time;
determining a plurality of time intervals, each having a corresponding interval signature, wherein said determining comprises searching the generated signatures for at least two consecutively indexed ones of the plurality of signatures that have the same sequence of bits, wherein a duration of a given one of the plurality of time intervals is based on the timestamps associated with said at least two consecutively indexed ones of the signatures;
applying a clustering method to the generated signatures corresponding to said plurality of time intervals to assign one of a plurality of operational states to each of said plurality of time intervals, wherein the time intervals that are associated with similar ones of the generated signatures are assigned the same operational state;
constructing a classification vector comprising the assigned operational state for each of said plurality of time intervals, wherein the assigned operational states of the classification vector are in said time order;

obtaining, for each of said plurality of time intervals, historical numerical sensor data from said plurality of sensors, wherein said historical numerical sensor data corresponds to measurements of said plurality of sensors during said associated time interval;

constructing a classification matrix comprising a plurality of rows corresponding to said determined plurality of time intervals, wherein the plurality of rows are in said time order and each row in the classification matrix comprises the historical numerical sensor data measured during the associated time interval; and training a machine learning model using said classification matrix as an input, and said classification vector as a target output, to obtain a plurality of coefficients of said machine learning model, wherein constructing the classification vector is based on the historical Boolean time series sensor data, and wherein constructing the classification matrix is based on the historical numerical sensor data.

2. The method of claim 1, wherein the clustering method comprises an unsupervised machine learning technique that determines one cluster label for each of said plurality of time intervals.

3. The method of claim 1, further comprising the step of storing said generated plurality of signatures in at least one signature table in said time order, wherein each entry of the at least one signature table comprises (i) one of the plurality of signatures and (ii) the respective timestamp, wherein the respective timestamp represents the corresponding given time.

4. The method of claim 3, further comprising the step of storing said plurality of time intervals and corresponding interval signatures in at least one interval table, wherein each entry in the at least one interval table comprises:

an integer representing (i) a first one of the timestamps corresponding to a start time of a given one of the plurality of time intervals and (ii) a second one of the timestamps corresponding to an end time of the given time interval; and said same sequence of bits corresponding to said at least two consecutively indexed ones of the generated signatures.

5. The method of claim 4, further comprising the step of storing said operational state assigned to each of said plurality of time intervals in said one or more interval tables.

6. The method of claim 1, further comprising the step of applying said plurality of coefficients to a classifier to classify current numerical sensor data.

7. The method of claim 1, further comprising the step of processing said plurality of coefficients to determine an operational state of an industrial plant.

8. The method of claim 1, wherein said historical Boolean time series sensor data and said historical numerical sensor data are obtained from a subset of available sensors.

9. The method of claim 1, further comprising the step of training a second machine learning model using said historical numerical sensor data corresponding to each of said plurality of time intervals as an input, and said next operational state assigned to each of said plurality of time intervals as a target output, wherein said second machine learning model discovers one or more future operational states.

10. The method of claim 1, wherein said generating the plurality of signatures is based only the historical Boolean time series sensor data.

11. A computer program product, comprising a non-transitory machine-readable storage medium having encoded therein executable code of one or more software programs, wherein the one or more software programs when executed by at least one processing device perform the following steps:

obtaining historical Boolean time series sensor data from a plurality of sensors, wherein said time series sensor data comprises a plurality of bits from each of said plurality of sensors, wherein each of the plurality of bits for a given one of said plurality of sensors corresponds to a state of a given one of said plurality of sensors for a given time;

generating a plurality of signatures indexed in time order based on respective timestamps associated with the plurality of signatures, wherein each of said plurality of signatures is comprised of a sequence of bits comprising one bit of said historical Boolean time series sensor data from each of said plurality of sensors for a corresponding given time;

determining a plurality of time intervals, each having a corresponding interval signature, wherein said determining comprises searching the generated signatures for at least two consecutively indexed ones of the plurality of signatures that have the same sequence of bits, wherein a duration of a given one of the plurality of time intervals is based on the timestamps associated with said at least two consecutively indexed ones of the signatures;

applying a clustering method to the generated signatures corresponding to said plurality of time intervals to assign one of a plurality of operational states to each of said plurality of time intervals, wherein the time intervals that are associated with similar ones of the generated signatures are assigned the same operational state;

constructing a classification vector comprising the assigned operational state for each of said plurality of time intervals, wherein the assigned operational states of the classification vector are in said time order;

obtaining, for each of said plurality of time intervals, historical numerical sensor data from said plurality of sensors, wherein said historical numerical sensor data corresponds to measurements of said plurality of sensors during said associated time interval;

constructing a classification matrix comprising a plurality of rows corresponding to said determined plurality of time intervals, wherein the plurality of rows are in said time order and each row in the classification matrix comprises the historical numerical sensor data measured during the associated time interval; and training a machine learning model using said classification matrix as an input, and said classification vector as a target output, to obtain a plurality of coefficients of said machine learning model, wherein constructing the classification vector is based on the historical Boolean time series sensor data, and wherein constructing the classification matrix is based on the historical numerical sensor data.

12. The computer program product of claim 11, further comprising the step of applying said plurality of coefficients to a classifier to classify current numerical sensor data.

13. The computer program product of claim 11, further comprising the step of processing said plurality of coefficients to determine an operational state of an industrial plant.

14. A system, comprising:
a memory; and
at least one processing device, coupled to the memory, operative to implement the following steps:
obtaining historical Boolean time series sensor data from a plurality of sensors, wherein said time series sensor data comprises a plurality of bits from each of said plurality of sensors, wherein each of the plurality of bits for a given one of said plurality of sensors corresponds to a state of a given one of said plurality of sensors for a given time;
generating a plurality of signatures indexed in time order based on respective timestamps associated with the plurality of signatures, wherein each of said plurality of signatures is comprised of a sequence of bits comprising one bit of said historical Boolean time series sensor data from each of said plurality of sensors for a corresponding given time;
determining a plurality of time intervals, each having a corresponding interval signature, wherein said determining comprises searching the generated signatures for at least two consecutively indexed ones of the plurality of signatures that have the same sequence of bits, wherein a duration of a given one of the plurality of time intervals is based on the timestamps associated with said at least two consecutively indexed ones of the signatures;
applying a clustering method to the generated signatures corresponding to said plurality of time intervals to assign one of a plurality of operational states to each of said plurality of time intervals, wherein the time intervals that are associated with similar ones of the generated signatures are assigned the same operational state;
constructing a classification vector comprising the assigned operational state for each of said plurality of time intervals, wherein the assigned operational states of the classification vector are in said time order;
obtaining, for each of said plurality of time intervals, historical numerical sensor data from said plurality of sensors, wherein said historical numerical sensor data corresponds to measurements of said plurality of sensors during said associated time interval;
constructing a classification matrix comprising a plurality of rows corresponding to said determined plurality of time intervals, wherein the plurality of rows are in said time order and each row in the classification matrix comprises the historical numerical sensor data measured during the associated time interval; and
training a machine learning model using said classification matrix as an input, and said classification vector as a target output, to obtain a plurality of coefficients of said machine learning model, wherein constructing the classification vector is based on the historical Boolean time series sensor data, and wherein constructing the classification matrix is based on the historical numerical sensor data.

15. The system of claim 14, wherein the clustering method comprises an unsupervised machine learning technique that determines one cluster label for each of said plurality of time intervals.

16. The system of claim 14, wherein said at least one processing device is further configured to store said generated plurality of signatures in at least one signature table indexed in said time order, wherein each entry of the at least one signature table comprises (i) one of the plurality of signatures and (ii) the respective timestamp, wherein the respective timestamp represents the corresponding given time.

17. The system of claim 15, wherein said at least one processing device is further configured to store said plurality of time intervals and corresponding interval signatures in at least one interval, wherein the at least one integer table comprises:
an integer representing (i) a first one of the timestamps corresponding to a start time of a given one of the plurality of time intervals and (ii) a second one of the timestamps corresponding to an end time of the given time interval; and
said same sequence of bits corresponding to said at least two consecutively indexed ones of the generated signatures.

18. The system of claim 14, wherein said at least one processing device is further configured to at least one of:
apply said plurality of coefficients to a classifier to classify current numerical sensor data; and
process said plurality of coefficients to determine an operational state of an industrial plant.

19. The system of claim 14, wherein said historical Boolean time series sensor data and said historical numerical sensor data are obtained from a subset of available sensors.

20. The system of claim 14, wherein said at least one processing device is further configured to train a second machine learning model using said historical numerical sensor data corresponding to each of said plurality of time intervals as an input, and said next operational state assigned to each of said plurality of time intervals as a target output, wherein said second machine learning model discovers one or more future operational states.

* * * * *